(12) United States Patent
Seth

(10) Patent No.: US 11,285,752 B2
(45) Date of Patent: Mar. 29, 2022

(54) MULTI-SHEET DOUBLE STICK LAYERED PAD

(71) Applicant: Sandeep Seth, Bellaire, TX (US)

(72) Inventor: Sandeep Seth, Bellaire, TX (US)

( * ) Notice: Subject to any disclaimer, the term of this patent is extended or adjusted under 35 U.S.C. 154(b) by 118 days.

(21) Appl. No.: 16/526,585

(22) Filed: Jul. 30, 2019

(65) Prior Publication Data
US 2019/0366753 A1 Dec. 5, 2019

Related U.S. Application Data

(62) Division of application No. 15/629,269, filed on Jun. 21, 2017, now Pat. No. 10,399,376.

(Continued)

(51) Int. Cl.
*B42D 5/00* (2006.01)
*B32B 7/06* (2019.01)
(Continued)

(52) U.S. Cl.
CPC ............... *B42D 5/003* (2013.01); *B32B 7/06* (2013.01); *B32B 7/12* (2013.01); *B42F 5/00* (2013.01); *F16B 11/006* (2013.01)

(58) Field of Classification Search
CPC ... B42D 5/003; B32B 7/06; B32B 7/12; C09J 7/00; C09J 7/20
(Continued)

(56) References Cited

U.S. PATENT DOCUMENTS 2,227,444 A 1/1941 Drew
4,890,608 A * 1/1990 Steer ................. A61F 5/443
602/52

(Continued)

FOREIGN PATENT DOCUMENTS

FR 2844476 A1 * 3/2004 ............. B42D 5/003
JP 2002284160 A * 10/2002

OTHER PUBLICATIONS

JP-2002284160-A English Translation (Year: 2002).*
Office Action for U.S. Appl. No. 15/629,269 dated Oct. 1, 2018.

*Primary Examiner* — Kyle R Grabowski
(74) *Attorney, Agent, or Firm* — C. Tumey Law Group PLLC

(57) ABSTRACT

A multi-layer pad of double-sided adhesive sheet material with individual pull-tabs. A method of making an adhesive sheet product may comprise: providing a first double-sided adhesive sheet having a first pull tab and a first adhesive strength on one side of the first double-sided adhesive sheet and a second adhesive strength on the other side of the first double-sided adhesive sheet; providing a second double-sided adhesive sheet having a second pull tab and a first adhesive strength on one side of the second double-sided sheet and a second adhesive strength on the other side of the second double-sided sheet; adhering the first double-sided adhesive sheet to the second double-sided sheet such that side with the second adhesive strength of the first double-sided adhesive sheet contacts the side with the first adhesive strength of the second double-sided adhesive sheet and such that the second pull tab is offset from the first pull tab; whereby a multi-layer double-sided adhesive pad is formed whereby the first double-sided adhesive sheet may be removed from the second double-sided adhesive sheet with the use of the first pull tab to expose the side having the first adhesive strength of the second double-sided adhesive sheet.

13 Claims, 3 Drawing Sheets

Related U.S. Application Data

(60) Provisional application No. 62/352,775, filed on Jun. 21, 2016.

(51) Int. Cl.
*B32B 7/12* (2006.01)
*B42F 5/00* (2006.01)
*F16B 11/00* (2006.01)

(58) Field of Classification Search
USPC ..................................... 428/40.1; 24/67 AR
See application file for complete search history.

(56) References Cited

U.S. PATENT DOCUMENTS

| | | | | |
|---|---|---|---|---|
| 5,011,186 | A * | 4/1991 | Bodziak | B42D 5/003 281/12 |
| 5,707,713 | A | 1/1998 | Langan et al. | |
| 6,248,414 | B1 * | 6/2001 | Donahue | B42F 15/066 24/67 AR |
| 6,403,189 | B1 * | 6/2002 | Donahue | B42F 15/066 24/67 AR |
| 6,482,487 | B1 * | 11/2002 | Donahue | B42D 5/003 24/67 AR |
| 6,503,591 | B2 * | 1/2003 | Kuo | G09F 3/10 428/41.9 |
| 10,383,402 | B2 * | 8/2019 | Kleinsasser | A43B 23/28 |
| 2003/0082327 | A1 * | 5/2003 | Pearson | G09F 3/10 428/40.1 |
| 2005/0167316 | A1 * | 8/2005 | Heinz | A47G 19/03 206/503 |
| 2014/0272233 | A1 * | 9/2014 | Downs | C09J 7/20 428/40.1 |

* cited by examiner

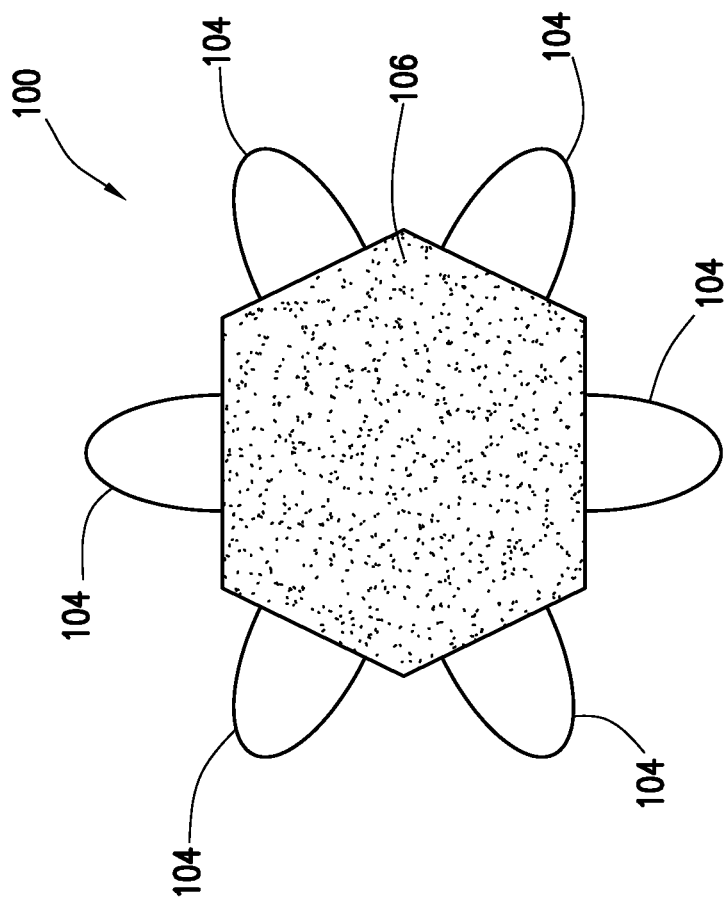
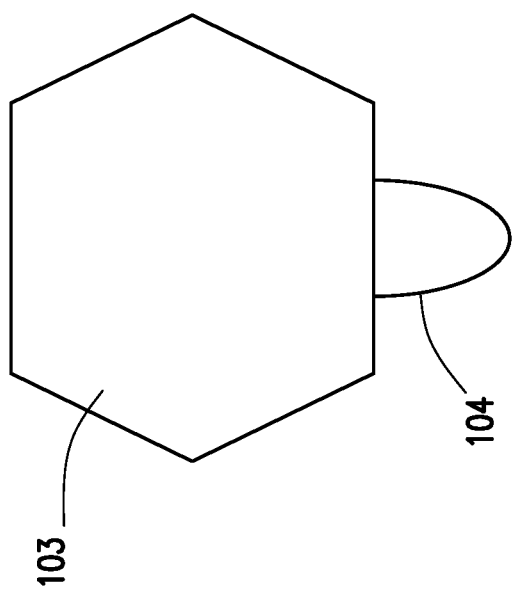
FIG. 3B
FIG. 3A

MULTI-SHEET DOUBLE STICK LAYERED PAD

CROSS-REFERENCE TO RELATED APPLICATIONS

This application is a divisional of U.S. application Ser. No. 15/629,269, filed Jun. 21, 2017, which is a a non-provisional of Provisional U.S. application Ser. No. 62/352,775 filed Jun. 21, 2016, which are herein incorporated by reference in their entirety.

BACKGROUND

Adhesive sheet pads have been used to record notes and place those notes on a surface utilizing the adhesive on the sheet pad. However, once the adhesive sheet pad has been removed from a surface, the adhesive may no longer function to hold the adhesive sheet pad to the surface. Thus, there is a need for an adhesive sheet pad that may be utilized multiple times on multiple surfaces and maintain the ability to adhere to any number of surfaces without loss of adhesion.

BRIEF DESCRIPTION OF THE DRAWINGS

These drawings illustrate certain aspects of some of the embodiments of the present disclosure and should not be used to limit or define the disclosure.

FIG. 3A illustrates another example embodiment of a multi-layer pad of double-sided adhesive sheet material with individual pull tabs.

FIG. 3B illustrates an example embodiment of another example embodiment of a multi-layer pad of double-sided adhesive sheet material with individual pull tabs.

DETAILED DESCRIPTION

Figure 1:
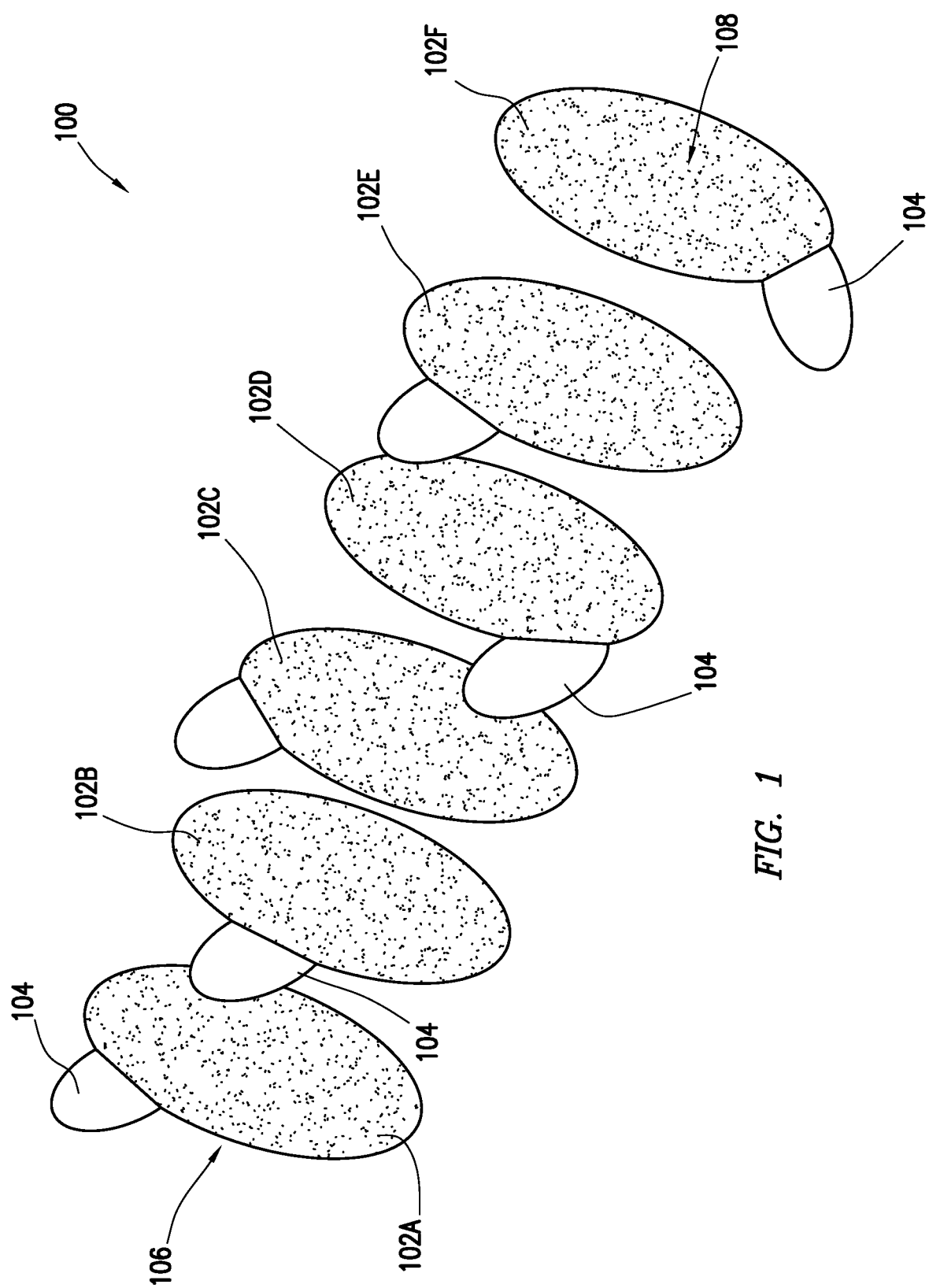
FIG. 1 illustrates an example embodiment of a multi-layer pad of double-sided adhesive sheet material with individual pull tabs.

The present disclosure may generally relate to a multi-layer pad of double-sided adhesive sheet material with individual pull tabs. Among other things, the multi-layer pad may allow an object to be restuck multiple times to a fixture by always providing fresh adhesive. Each time the object is to be restuck the user may peel off the old adhesive layer from the pad and uses a fresh adhesive layer. Without limitation, the multi-layer pad may be used in a residential or commercial building to attach various objects to a fixture, such as a wall, ceiling, or other fixture thereof. By way of example, the multi-layer pad may be used to attach objects, such as pictures, mirrors, camera, speakers, smoke detectors, motion detectors, and glass breakage detectors, among others. While the discussion herein, may describe attachment to an object and a fixture, it should understood that the multi-layer pad should not be limited to attachment of an object to a fixture. By way of example, the multi-layer pad may alternative be used to secure an object to a different object.

In some embodiments, each double-sided sheet forming a pad layer may have a different adhesive strength on each side. In some embodiments, when the pad side having the greater adhesive strength is stuck to an object and the other side stuck to a fixture, the object may be subsequently removed from the fixture, the spent pad layer may be peeled off and a fresh pad layer may be exposed to re-stick the object on the same or a different fixture or position. In some embodiments, when the pad side having the lesser strength is stuck to an object and the side having the greater adhesive strength is applied to a fixture, the object may be removed from the pad, the spent pad layer may be peeled off and a fresh pad layer may be exposed and the same or a new object may be stuck to the fresh layer.

An embodiment may provide a method of making an adhesive sheet product comprising: providing a first double-sided adhesive sheet having a first pull tab and a first adhesive strength on one side of the first double-sided adhesive sheet and a second adhesive strength on the other side of the first double-sided adhesive sheet; providing a second double-sided adhesive sheet having a second pull tab and a first adhesive strength on one side of the second double-sided sheet and a second adhesive strength on the other side of the second double-sided sheet; adhering the first double-sided adhesive sheet to the second double-sided sheet such that side with the second adhesive strength of the first double-sided adhesive sheet contacts the side with the first adhesive strength of the second double-sided adhesive sheet and such that the second pull tab is offset from the first pull tab; whereby a multi-layer double-sided adhesive pad is formed whereby the first double-sided adhesive sheet may be removed from the second double-sided adhesive sheet with the use of the first pull tab to expose the side having the first adhesive strength of the second double-sided adhesive sheet.

An embodiment may comprise a multi-layer double-side adhesive pad comprising: a first double-sided adhesive sheet having a first pull tab and a first adhesive strength on one side of the first double-sided adhesive sheet and a second adhesive strength on the other side of the first double-sided adhesive sheet; and a second double-sided adhesive sheet having a second pull tab and a first adhesive strength on one side of the second double-sided adhesive sheet and a second adhesive strength on the other side of the second double-sided adhesive sheet; wherein the second double-sided adhesive sheet is coupled to the first double-sided adhesive sheet such the side with the second adhesive strength of the first double-sided adhesive sheet contacts the side with the first adhesive strength of the second double-sided adhesive sheet and such that the second pull tab is offset from the first pull tab. Each pull tab may or may not have adhesive on one or more sides. Each pull tab may be integrally formed with a sheet or may be separate from the sheet and secured to the sheet in any suitable manner.

Referring now to FIG. 1, an embodiment of multi-layer pad 100 is illustrated. As illustrated, multi-layer pad 100 may include double-sided adhesive sheets 102a, 102b, 102c, 102d, 102e and 102f including individual pull-tabs 104. While FIG. 1 illustrates each of double-sided adhesive sheets having an individual pull-tab 104, it should be understood that the individual pull-tabs 104 may only be provided with one or more of the double-side adhesive sheets 102a, 102b, 102c, 102d, 102e, and 102f as desired for a particular application. As illustrated, the individual pull-tabs 104 may be offset from one another, for example, radially offset. Each double-sided adhesive sheet 102a, 102b, 102c, 102d, 102e and 102f may include a first side 106 and a second side 108 which may each have a different adhesive strength. For example, first side 106 may have a greater adhesive strength than second side 108. By way of example, first side 106 may have an adhesive strength that is greater than the adhesive strength of the second side by about 5% or more, about 10% or more, about 50% or more, or about 100% or more.

Use of multi-layer pad 100 to attach an object to a fixture will now be described in accordance with an example embodiment. In some embodiments, first side 106 of double-sided adhesive sheet 102a may be attached to an object. Second side 108 of double-sided adhesive sheet 102f may be attached to a fixture. It may be desired to remove the object from the fixture and re-attached to at a different position or to a different fixture. After removal of second side 108 of double-sided adhesive sheet 102f from the fixture, the spent sheet (e.g., double-sided adhesive sheet 102f) may be peeled off and a fresh double-sided adhesive sheet (e.g., double-sided adhesive sheet 102e) may be exposed to re-stick the object on the same or a different fixture or position. Individual pull tab 104 may be used to manually peel the spent layer to expose a fresh layer. In the alternative, it may be desired to remove the object from the multi-layer pad 100. This may enable another object to be attached to the fixture at the same position or use of the multi-layer pad 100 to attach another object to the fixture or a different fixture. After removal of the object from first side 106 of double-sided adhesive sheet 102a, the spent sheet (e.g., double-sided adhesive sheet 102a) may be peeled off and a fresh double-sided adhesive sheet (e.g., double-sided adhesive sheet 102b) may be exposed to re-stick another object to the multi-layer pad 100.

In some embodiments, second side 108 of double-sided adhesive sheet 102f may be attached to an object while the first side 106 of double-sided adhesive sheet 102a may be applied to a fixture. It may be desired to remove the object from the multi-layer pad 100 and attached a different object thereto. After removal of the object, the spent double-sided adhesive sheet (e.g., double-sided adhesive sheet 102f) may be peeled off and a fresh double-sided adhesive sheet (e.g., double-sided adhesive sheet 102e) may be exposed and the same or a new object may be stuck to the fresh double-sided adhesive sheet (e.g., double-sided adhesive sheet 102e).

Figure 2:
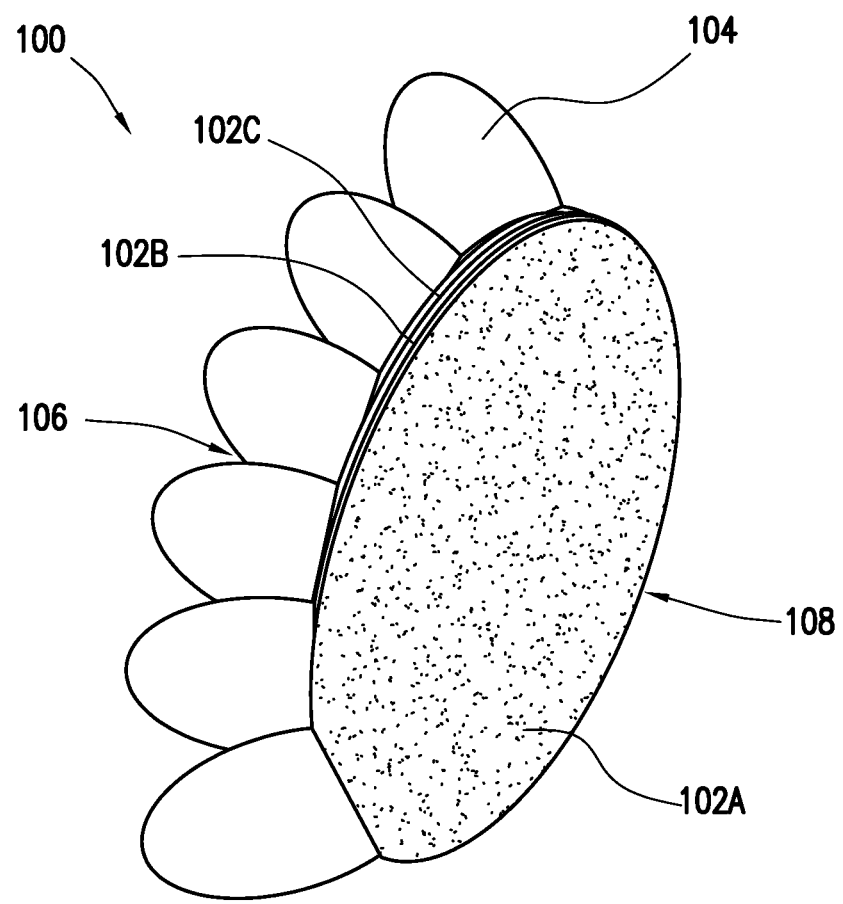
FIG. 2 illustrates another example embodiment of a multi-layer pad of double-sided adhesive sheet material with individual pull tabs.

Referring to FIG. 2, multi-layer pad 100 is shown in accordance with example embodiments. As illustrated, multi-layer pad 100 may include double-sided adhesive sheets 102a, 102b and 102c which may include radially offset pull tabs 104. Each double-sided adhesive sheet 102a, 102b and 102c may include sides 106, 108 which may each have a different adhesive strength. Side 106 may have a greater adhesive strength than side 108. Radially offset pull tabs 104 may be finger pull tabs which may be used to manually peel a spent double-sided adhesive sheet (e.g., double-sided adhesive sheet 102a) and expose a fresh double-sided adhesive sheet (e.g., double-sided adhesive sheet 102b). Side 106 may attach to an object, such as, for example, a smoke alarm, to be attached to a fixture, such as a wall. Side 108 may attach to a fixture, such as a wall.

Referring to FIG. 3, multi-layer pad 100 is shown in accordance with example embodiments. As illustrated, multi-layer pad 100 may include double-sided adhesive sheets (e.g., 102a, 102b and 102c, as shown in FIG. 2) and non-adhesive front/back pad cover sheets 103 with pull tabs 104. In some embodiments, the cover sheets 103 may have adhesive on the side facing the adhesive sheets and no adhesive on the opposite side. In other embodiments, the cover sheets 102 may have no adhesive on either side. In some embodiments, the cover sheets 102 may be placed on either side of the multi-layer pad 100 so that the adhesive is not exposed prior to use. The cover sheets 103 may be peeled from the front and back of the multi-layer pad 100 prior to its first use, for example, to expose the first adhesive double-sided sheet 106. The double-sided adhesive sheets (e.g., 102a, 102b and 102c, as shown in FIG. 2) may be clear or any color. The non-adhesive front/back pad cover sheets 103 may be clear or same or different color than the double-sided adhesive sheets (e.g., 102a, 102b and 102c, as shown in FIG. 2) forming the multi-layer pad 100. The multi-layer pad 100 may be any shape (e.g., polygon, oval, circular, elliptical, etc.) or any size depending on the object to be stuck. The multi-layer pad 100 may be thin. For example, the multi-layer pad 100 may have a thickness of from about 0.1 millimeter to about 5 centimeters. Each of the double-sided adhesive sheets (e.g., 102a, 102b, and 102c) may have a thickness of about 0.01 millimeters to about 1 centimeter. It should be understood that these size ranges are merely exemplary and the multi-layer pad 100 and double sided adhesive sheets (e.g., 102a, 102b, and 102c) may have sizes outside these disclosed ranges.

The present disclosure is illustrated herein by example, and various modifications may be made by a person of ordinary skill in the art. It is believed that the operation and construction of the present disclosure will be apparent from the foregoing description. While the apparatus and methods shown or described above have been characterized as being preferred, various changes and modifications may be made therein without departing from the spirit and scope of the disclosure as defined in the following claims.

What is claimed is:

1. A multi-layer double-side adhesive pad for coupling an object to a surface comprising:
  a first adhesive sheet having a first pull tab extending therefrom and having an adhesive layer spanning a distal side of the first adhesive sheet and spanning a proximal side thereof;
  a second adhesive sheet having a second pull tab extending therefrom and having an adhesive layer spanning a distal side of the second adhesive sheet and an adhesive layer spanning a proximal side thereof, wherein the distal side of the second adhesive sheet is adhered to the proximal side of the first adhesive sheet such that the second pull tab is radially offset from the first pull tab;
  a third adhesive sheet having a third pull tab extending therefrom and having an adhesive layer spanning a distal side of the third adhesive sheet and an adhesive layer spanning a proximal side thereof, the distal side of the third adhesive sheet adhered to the proximal side of the first adhesive sheet and the proximal side of the third adhesive sheet adhered to the distal side of the second adhesive sheet, such that the third pull tab is radially offset from both the first pull tab and the second pull tab;
  wherein the second tab is radially offset from the first tab in a first direction and the third tab is radially offset from the second tab in a second direction, wherein the second direction is opposite the first direction;
  a first cover sheet having a fourth pull tab extending therefrom, the first cover sheet adhered to the adhesive layer on the distal side of the first adhesive sheet such that the fourth pull tab is radially offset from the first pull tab; and
  a second cover sheet having a fifth pull tab extending therefrom, the second cover sheet adhered to the adhesive layer on the proximal side of the second adhesive sheet such that the fifth pull tab is radially offset from the second pull tab;
  wherein each pull tab of each sheet of the multi-layer double-sided adhesive pad is thereby radially offset from the pull tab of the prior sheet; and wherein the adhesive layer spanning the distal side of the first adhesive sheet is exposed and the multi-layered pad may be adhered to the surface after the first cover sheet is removed and the adhesive layer spanning the proximal side of the second adhesive sheet is exposed and the multi-layered pad may be adhered to the object after the second cover sheet is removed.

2. A multi-layer double-sided adhesive pad as set forth in claim 1,
wherein the adhesive layer spanning the distal side of the third adhesive sheet is exposed when the first adhesive sheet is removed from the multi-layered pad and the adhesive layer spanning the proximal side of the third adhesive sheet is exposed when the second adhesive sheet is removed.

3. The multi-layer double-sided adhesive pad as set forth in claim 2, further comprising:
one or more additional adhesive sheets, each additional adhesive sheet having its own pull tab extending therefrom and an adhesive layer spanning a distal side thereof and an adhesive layer spanning a proximal side thereof, wherein the distal side of each additional sheet is adhered to the proximal side to the prior adhesive sheet such that the pull tab of the additional adhesive sheet is offset from the pull tab of the prior adhesive sheet;
wherein the proximal side of each additional adhesive sheet is adhered to the distal side of a next adhesive sheet such that the pull tab of the additional adhesive sheet is offset from the pull tab of the next adhesive sheet; and
wherein the adhesive layer spanning the distal side of the additional adhesive sheet is exposed when the prior adhesive sheet is removed from the multi-layered pad and the adhesive layer spanning the proximal side of the additional adhesive sheet is exposed when the next adhesive sheet is removed.

4. The multi-layer double-sided adhesive pad as set forth in claim 3, wherein the multi-layer double-sided adhesive pad is polygon shaped and each tab is radially offset from the prior tab by extending from a different side of the polygon than the prior tab.

5. The multi-layer double-sided adhesive pad as set forth in claim 3, wherein the multi-layer double-sided adhesive pad is circular or oval shaped and each tab is radially offset from the prior tab by extending from a different location on the circumference of the pad.

6. The multi-layer double-sided adhesive pad as set forth in claim 3, wherein each tab displays a different index value, wherein each index value comprises a corresponding sequential letter or number.

7. The multi-layer double-sided adhesive pad as set forth in claim 3, wherein each multi-layer double-sided adhesive pad sheet has a color and the tab is of a corresponding color.

8. The multi-layer double-sided adhesive pad as set forth in claim 1, wherein the adhesive on each sheet's proximal side has a different adhesive strength than the adhesive on each sheet's distal side.

9. The multi-layer double-sided adhesive pad as set forth in claim 1, wherein each pull tab is inclined relative to the plane of its corresponding adhesive sheet.

10. A multi-layer double-side adhesive pad for coupling an object to a surface comprising:
a first adhesive sheet having a first pull tab extending therefrom and having an adhesive layer substantially spanning a distal side of the first adhesive sheet and substantially spanning a proximal side thereof;
a second adhesive sheet having a second pull tab extending therefrom and having an adhesive layer substantially spanning a distal side of the second adhesive sheet and an adhesive layer substantially spanning a proximal side thereof, wherein the distal side of the second adhesive sheet is adhered to the proximal side of the first adhesive sheet such that the second pull tab is radially offset from the first pull tab;
a third adhesive sheet having a third pull tab extending therefrom and having an adhesive layer substantially spanning a distal side of the third adhesive sheet and an adhesive layer substantially spanning a proximal side thereof, the distal side of the third adhesive sheet adhered to the proximal side of the first adhesive sheet and the proximal side of the third adhesive sheet adhered to the distal side of the second adhesive sheet, such that the third pull tab is radially offset from both the first pull tab and the second pull tab;
wherein the adhesive layer substantially spanning the distal side of the third adhesive sheet is exposed when the first adhesive sheet is removed from the multi-layered pad and the adhesive layer substantially spanning the proximal side of the third adhesive sheet is exposed when the second adhesive sheet is removed; and
wherein the second tab is radially offset from the first tab in a first direction and the third tab is radially offset from the second tab in a second direction, wherein the second direction is opposite the first direction.

11. The multi-layer double-sided adhesive pad as set forth in claim 10, further comprising:
one or more additional adhesive sheets, each additional adhesive sheet having its own pull tab extending therefrom and an adhesive layer substantially spanning a distal side thereof and an adhesive layer substantially spanning a proximal side thereof, wherein the distal side of each additional sheet is adhered to the proximal side to the prior adhesive sheet such that the pull tab of the additional adhesive sheet is radially offset from the pull tab of the prior adhesive sheet;
wherein the proximal side of each additional adhesive sheet is adhered to the distal side of a next adhesive sheet such that the pull tab of the additional adhesive sheet is radially offset from the pull tab of the next adhesive sheet; and
wherein the adhesive layer substantially spanning the distal side of the additional adhesive sheet is exposed when the prior adhesive sheet is removed from the multi-layered pad and the adhesive layer substantially spanning the proximal side of the additional adhesive sheet is exposed when the next adhesive sheet is removed.

12. The multi-layer double-side adhesive pad of claim 11, wherein the pull tab of the additional adhesive sheet is radially offset from the pull tab of the prior adhesive sheet in a first direction, wherein the pull tab of the next adhesive sheet is radially offset from the pull tab of the additional adhesive sheet in a second direction, wherein the second direction is opposite the first direction.

13. The multi-layer double-side adhesive pad of claim 10, wherein the pull tabs of the adhesive sheets radially offset from each other in alternating directions along the multi-layered pad.

* * * * *